April 30, 1968 R. R. PAULY ET AL 3,380,696
SUPPORTING STANDARD FOR BARBECUE GRILLS OR THE LIKE
Filed June 23, 1966
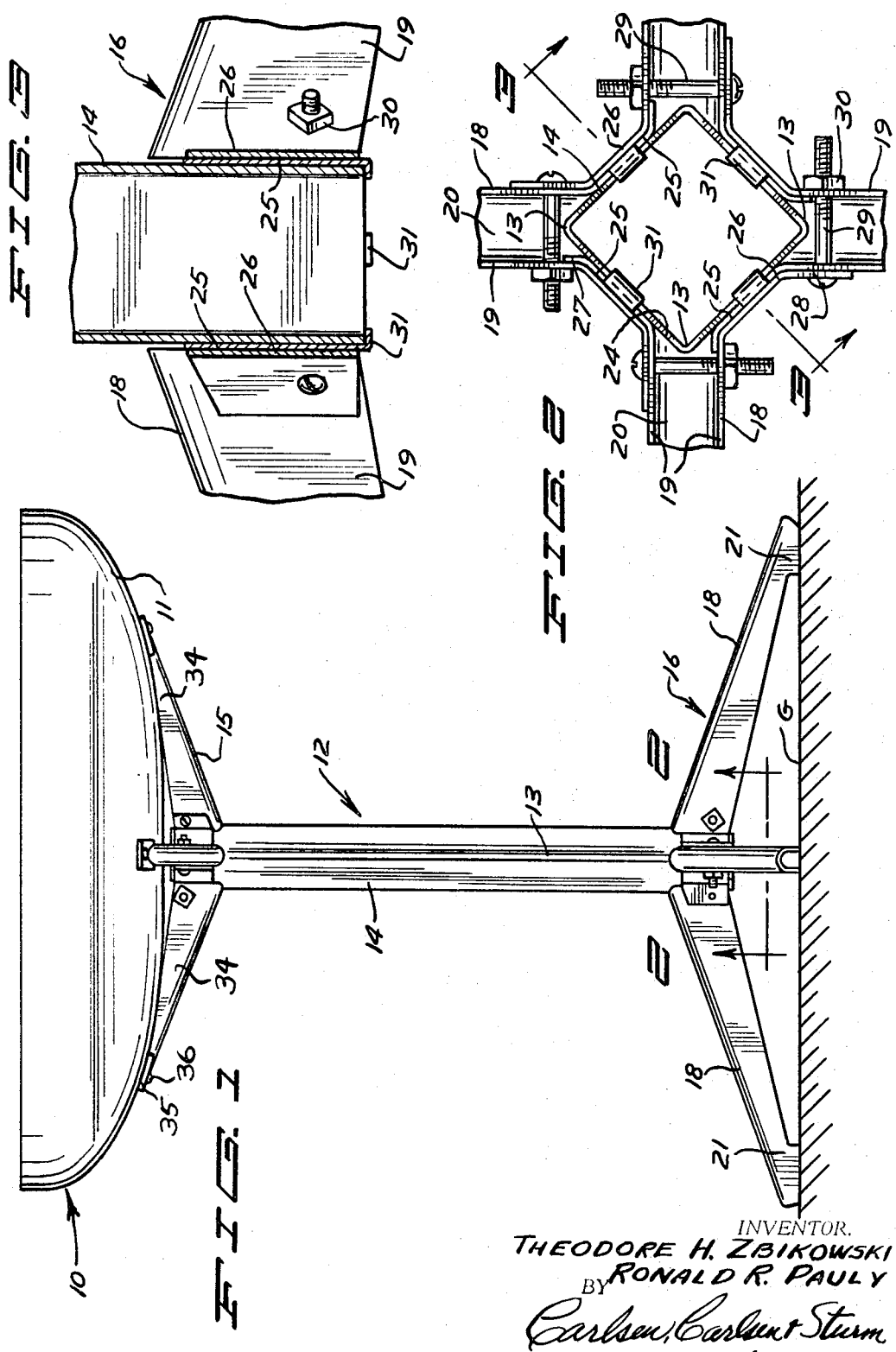
INVENTOR.
THEODORE H. ZBIKOWSKI
RONALD R. PAULY
BY
Carlsen, Carlsen & Sturm
ATTORNEYS

United States Patent Office 3,380,696
Patented Apr. 30, 1968

3,380,696
SUPPORTING STANDARD FOR BARBECUE
GRILLS OR THE LIKE
Ronald R. Pauly, St. Bonifacius, and Theodore H. Zbikowski, Fridley, Minn., assignors to Tonka Corporation, Mound, Minn., a corporation of Minnesota
Filed June 23, 1966, Ser. No. 559,773
2 Claims. (Cl. 248—188.7)

ABSTRACT OF THE DISCLOSURE

A pedestal for an upright post supporting a barbecue grill or the like. The pedestal comprises a plurality of identical feet extending radially from the lower end of the post with each foot having flanges at its inner end for connecting it to next adjacent feet to bend the feet inner ends tightly around the post.

This invention relates generally to pedestal type supporting structures of the kind frequently used for small tables, barbecue grills or like articles of furniture and particularly such a structure which includes a single upright post having a relatively broad spreading base at its bottom for engagement with the floor or ground surface.

It is desirable that certain types of outdoor furniture, particularly of the functional type such as relatively inexpensive barbecue grills, be provided with a support structure which can be manufactured and shipped at a low cost and yet which will rigidly support the grill fire bowl in the desired position for use.

The principal object of the present invention is to provide a new and improved base supporting structure for a barbecue grill or the like.

Another and more specific object of the invention is to provide a pedestal type supporting structure for a barbecue grill or the like wherein the base structure is formed of a plurality of identical components arranged in circumferentially spaced relationship around a center upright post with the components being readily detachable for shipment or storage.

With these and other objects in mind the invention broadly comprises an upright center post adapted to be connected to and to support a barbecue fire bowl or table top at its upper end, a plurality of identical base feet extending radially from the bottom portion of the post and equally spaced circumferentially therearound, and said base feet having flanges at their inner ends for connecting each foot to the next adjacent foot so as to bind the inner ends tightly and immovably around the post.

The above mentioned and still additional objects of the invention will be brought to light during the course of the following specification, reference being made to the accompaning drawing, in which:

FIG. 1 is an elevation of a barbecue grill mounted on the improved supporting standard.

FIG. 2 is an enlarged inverted plan view of the central portion of the pedestal taken along line 2—2 and looking upwardly.

FIG. 3 is a fragmentary vertical section taken on line 3—3 of FIG. 2.

Referring now more particularly to the drawing reference numerals will be used to denote like parts or structural features in the different views. The numeral 10 denotes generally a barbecue grill designed for outdoor cooking. The grill has a broad circular bowl 11 for holding charcoal or the like and which bowl is supported in a conveniently raised position over the ground surface G by a supporting understructure or standard denoted generally at 12.

The standard 12 comprises an upright post 14 carrying a bowl mounting structure 15 at its upper end and a base or pedestal structure 16 at its lower end. Post 14 is a hollow square in cross-section, as shown in FIG. 2, and in FIG. 1 one of the corners 13 of the post points directly toward the viewer.

The base structure 16 will first be described in detail. It comprises four identical foot members each designated generally at 18. Each foot member 18 is of inverted channel construction with spaced side walls 19 connected by an arched top wall 20. The feet taper gradually in their extension away from post 14 and may be formed as at 21 on their extended ends for flush engagement with the ground surface G. It could conceivably be desirable to mount wheels on the portions 21.

The construction and design of the inner end of foot member 18 is particularly significant to this invention. The inner end of the arched top wall 20 is provided with a V-shaped notch 24 to receive and conform closely to the adjacent corner 13 of the post 14. The inner end portions of the side walls 19 are bent outwardly as respectively denoted at 25 and 26 with such portions lying at right angles to each other to extend along and parallel to adjacent sides of the post 14. The extended ends or terminals of the portions 25 and 26 are respectively bent outwardly as at 27 and 28 to lie on parallel planes which are perpendicular to the walls 19 of the foot member.

It will be observed in FIG. 2 that the terminal 25 of each foot member will lie between a side wall of post 14 and the terminal 26 of the next adjacent foot member. Actually the member 26 nests within but on the outer side of the portion 25. Each terminal 28 which is slightly longer than terminal 27 is provided with an aperture for receiving bolt 29. When the feet are assembled around the post the aperture in terminal 28 aligns with apertures in side walls 19. Bolt 29 accordingly secures the terminal 28 securely to the next adjacent foot member 18, being held securely therein by the nut 30. When all of the foot members 18 are secured together in this manner they will be held tightly against the post 14 as best shown in FIG. 2. Each of the terminals 25 has a rest tab 31 projecting inwardly to engage under and support one wall of the post 14 to restrain the post from sliding downwardly in the base 16.

The bowl mounting structure 15 is made up of four support units 34 arranged to extend radially from the post 14. These members 34 may have their inner ends constructed and connected to the post in substantially the same manner as foot member 18. The channels, however, open upwardly toward the bowl 11 angling slightly upward in their radial extension from the post. The terminals 35 of the members 34 are flattened and secured to the bottom of bowl 11 as by rivets 36.

The standard thus provided is attractive, rigid, inexpensive and can be shipped in a knocked-down condition for ready assembly by the grill user.

It is understood that suitable modifications may be made in the structure as disclosed, provided such modifications come within the spirit and scope of the appended claims.

Having now therefore fully illustrated and described our invention, what we claim to be new and desire to protect by Letters Patent is:

1. In a standard for supporting a barbecue grill or the like over a supporting surface, an upright post having means at its upper end for connection to the grill, at least three foot members extending downwardly in radial directions from the lower portion of the post and spaced equidistantly therearound, each foot member having first and second flanges on its inner end one of which is bolted securely to the next adjacent foot member so that the inner ends of all of the foot members are secured together tightly around the post, said foot members all being of equal length and extending equally downward in their outward extension from the post to support the post vertically and spaced above the supporting surface, each foot having its first flange lying between the post and second flange of the foot to one side thereof and the second flange lying outside of the first flange on the member to the other side thereof.

2. A standard for supporting a barbecue grill or the like over a ground surface, an upright elongated post which is square in cross-section, means on the upper end of the post adapted to be rigidly connected to the underside of the grill, and a pedestal for supporting said post in vertical position over a ground surface, said pedestal comprising four identical foot members spaced circumferentially around the lower end portion of the post and extending radially and angling downwardly therefrom one from each corner of the post, each foot member inner end having a pair of horizontally spaced and diverging flanges disposed at right angles to one another to fit against the post side walls meeting at the corner from which said foot extends, one of said flanges having an apertured terminal portion extending along and bolted to the next adjacent foot member whereby all of said foot members are bolted together around the post.

References Cited

UNITED STATES PATENTS

| | | | |
|---|---|---|---|
| 1,930,742 | 10/1933 | De Saussure | 108—150 |
| 2,172,019 | 9/1939 | Brainard | 248—188.7 |
| 3,286,966 | 11/1966 | Botkin | 248—188.7 |

CHANCELLOR E. HARRIS, *Primary Examiner.*